Sept. 1, 1942.                    R. SARDESON                    2,294,695
                                FOOD COOKING DEVICE
                                Filed Aug. 4, 1938                7 Sheets-Sheet 2
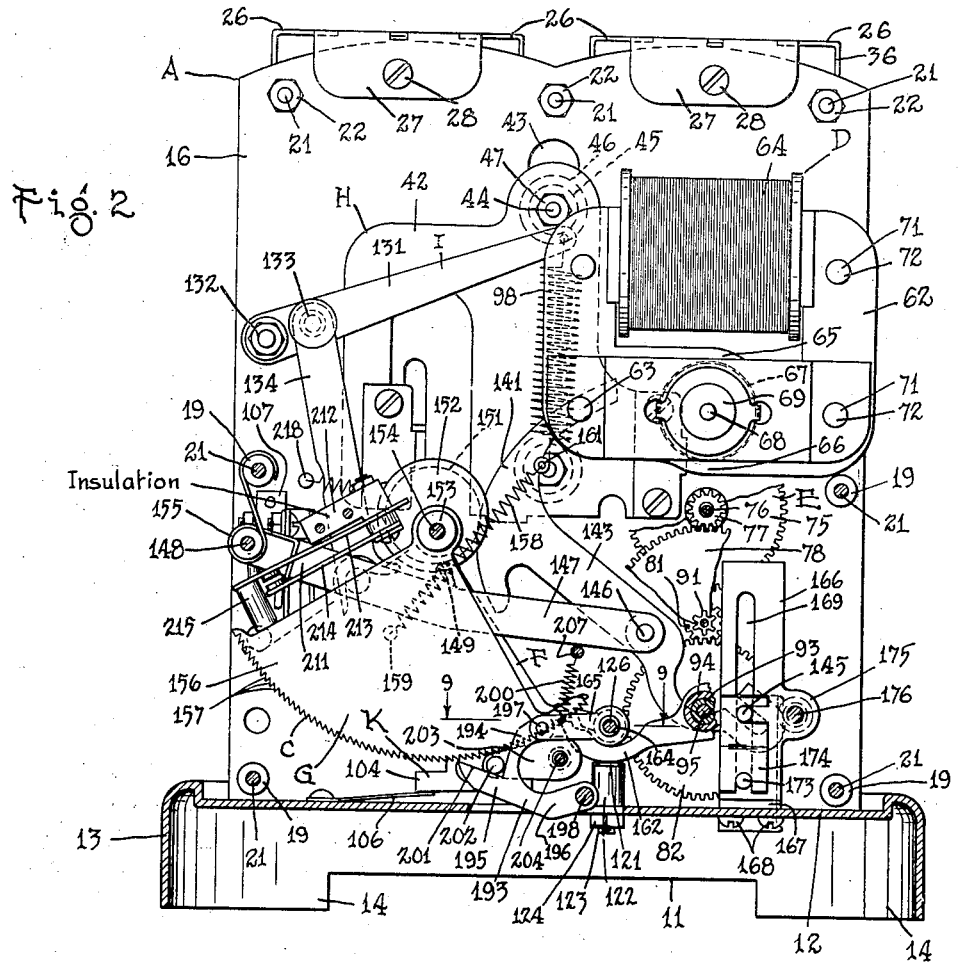
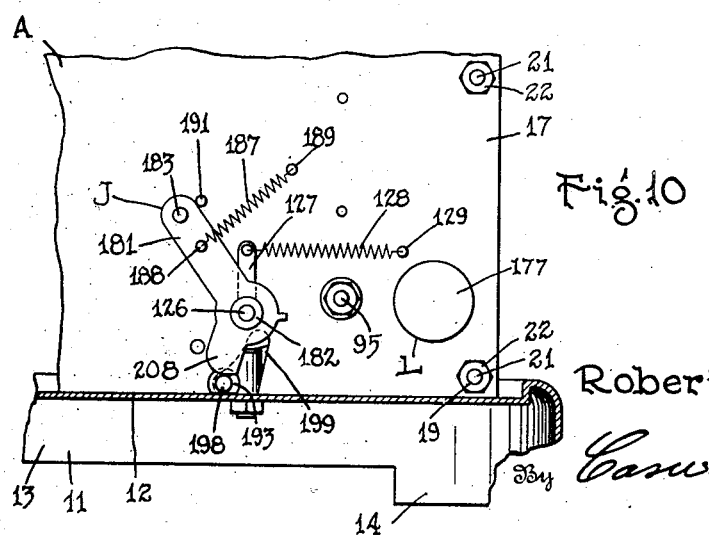
Inventor
Robert Sardeson
By Caswell & Lagaard
Attorneys Sept. 1, 1942.    R. SARDESON    2,294,695
FOOD COOKING DEVICE
Filed Aug. 4, 1938    7 Sheets-Sheet 3

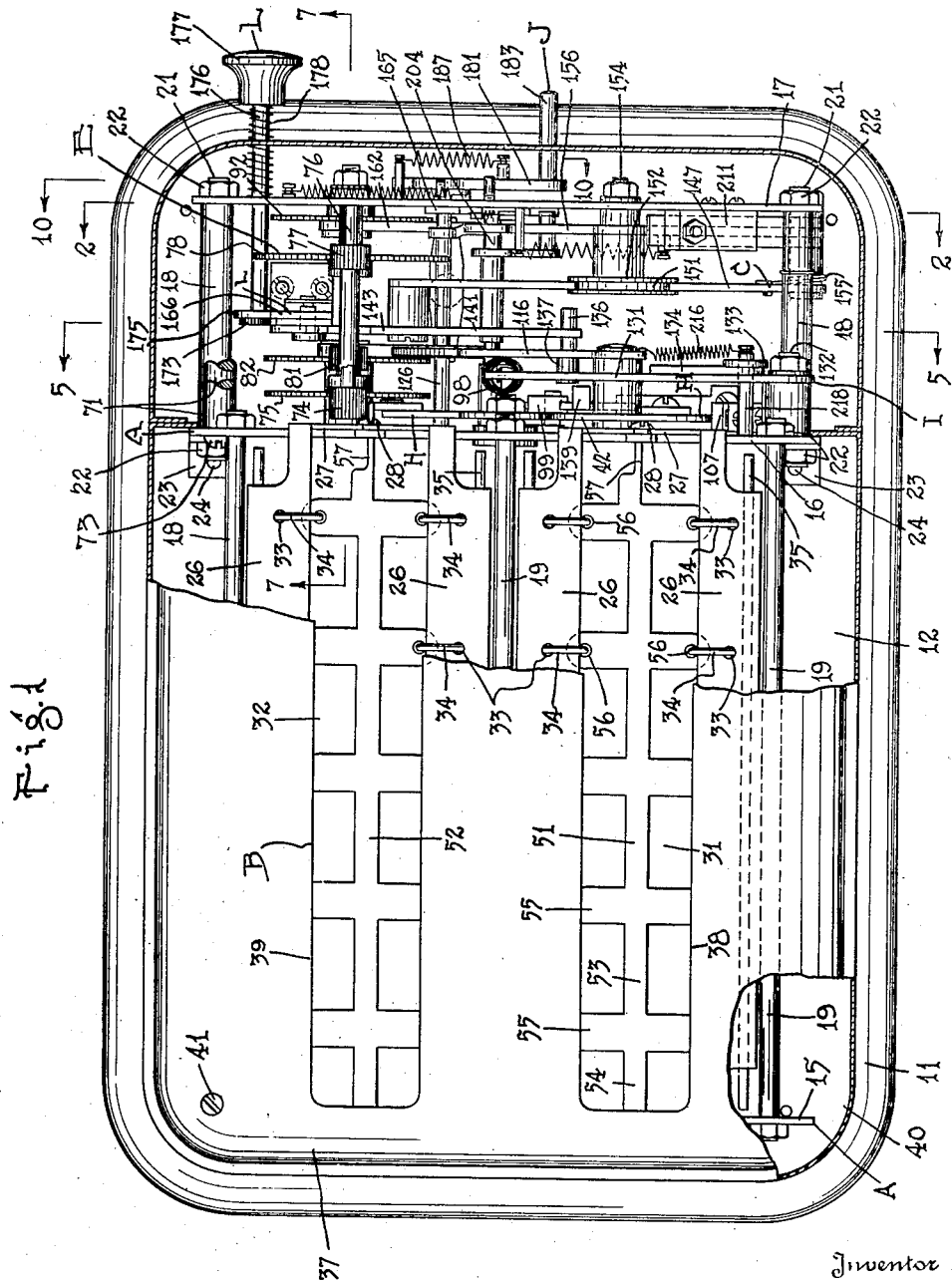

Inventor
Robert Sardeson
By Caswell & Lagaard
Attorneys

Sept. 1, 1942.  R. SARDESON  2,294,695
FOOD COOKING DEVICE
Filed Aug. 4, 1938    7 Sheets-Sheet 4

Inventor
Robert Sardeson
By Caswell & Lagaard
Attorneys

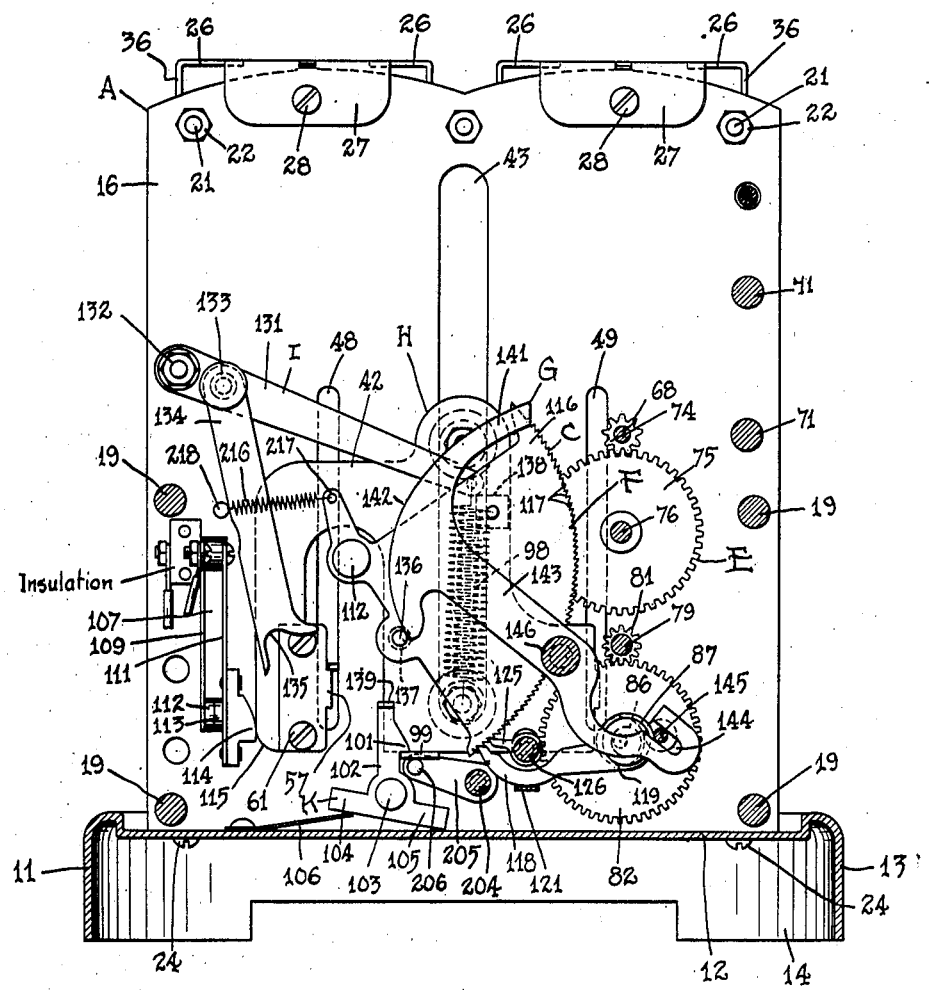

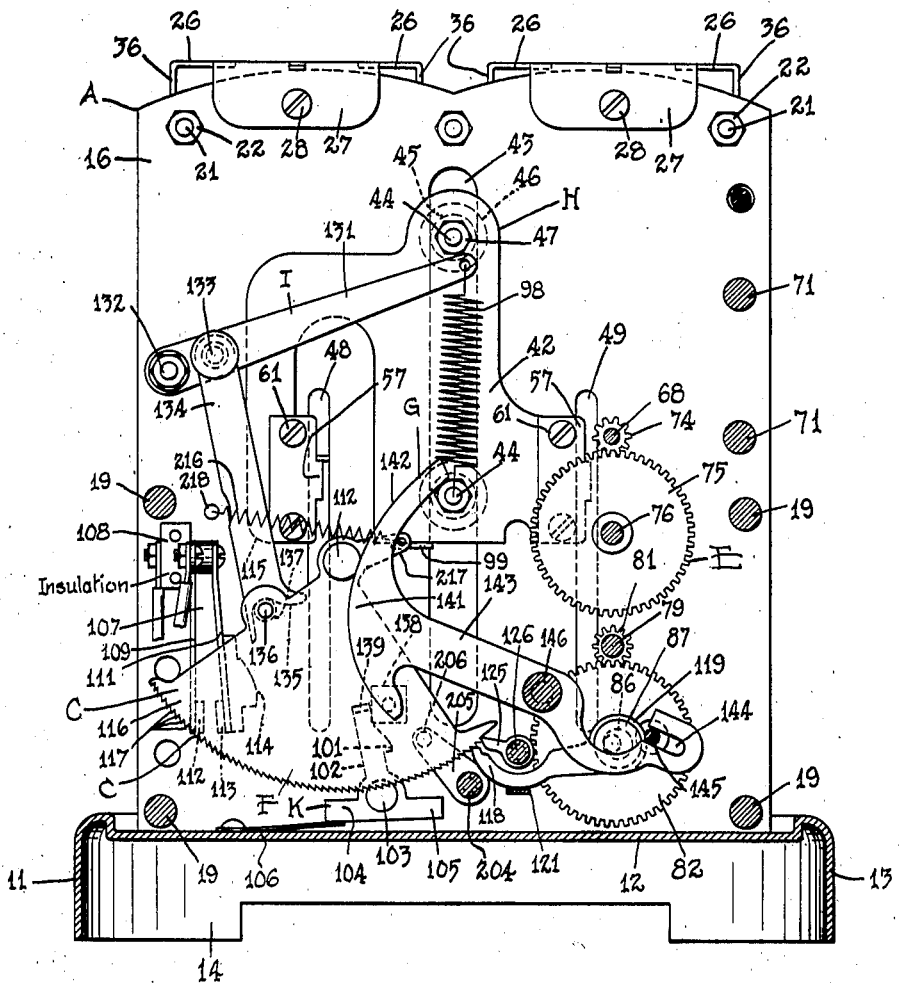

Sept. 1, 1942.   R. SARDESON   2,294,695
FOOD COOKING DEVICE
Filed Aug. 4, 1938   7 Sheets-Sheet 7

Inventor
Robert Sardeson
By Caswell & Lagaard
Attorneys

Patented Sept. 1, 1942

2,294,695

UNITED STATES PATENT OFFICE 2,294,695

FOOD COOKING DEVICE

Robert Sardeson, Minneapolis, Minn., assignor to Harold C. Genter, Miami Beach, Fla.

Application August 4, 1938, Serial No. 223,063

28 Claims. (Cl. 161—16)

My invention relates to food cooking devices and particularly to operating mechanisms therefor and has for an object to provide a device which will be positive in action and which will repeatedly produce accurate and identical results.

Another object of the invention resides in providing an operating device which will produce exactly the same results regardless of the temperature of the cooking apparatus or the operating mechanism.

An object of the invention resides in providing an operating mechanism which operates independently of thermostats and other heat controlled devices and in which compensation for variation in the temperature of the apparatus is positively procured.

A still further object of the invention resides in providing an operating mechanism which is controlled by mechanical devices instead of thermal devices.

Another object of the invention resides in providing an operating mechanism which is controlled solely through time controlled devices.

An object of the invention resides in providing an operating mechanism utilizing two time controlled movable members in which one of the members is operated during the cooking period to determine the duration thereof and in which the other is operated during the period of rest to vary the succeeding period of operation of the first member.

Other objects of the invention reside in the novel combination and arrangement of parts and in the details of construction hereinafter illustrated and/or described.

While my invention may be used in various food cooking devices, I have for the sake of illustration disclosed the invention as embodied in a bread toaster.

In the drawings:

Fig. 1 is a plan view of a bread toaster with a portion of the same cut away and illustrating an embodiment of my invention.

Fig. 2 is a cross sectional view taken on line 2—2 of Fig. 1 and showing the parts in normal position.

Fig. 5 is a cross sectional view taken on line 5—5 of Fig. 1 and showing the parts arranged as in Fig. 3.

Fig. 6 is a view similar to Fig. 5 showing the parts arranged as in Fig. 4.

Fig. 10 is a fragmentary elevational sectional view taken on line 10—10 of Fig. 1.

In the compensation of cooking devices for reduction in cooking time occasioned by the rise in temperature of the cooking apparatus the customary practice has been to utilize thermostats and other thermally responsive members. Such construction has been found to be delicate in operation and generally unreliable and unsatisfactory. The present invention provides a device which entirely overcomes these disadvantages and objections.

Figure 7:
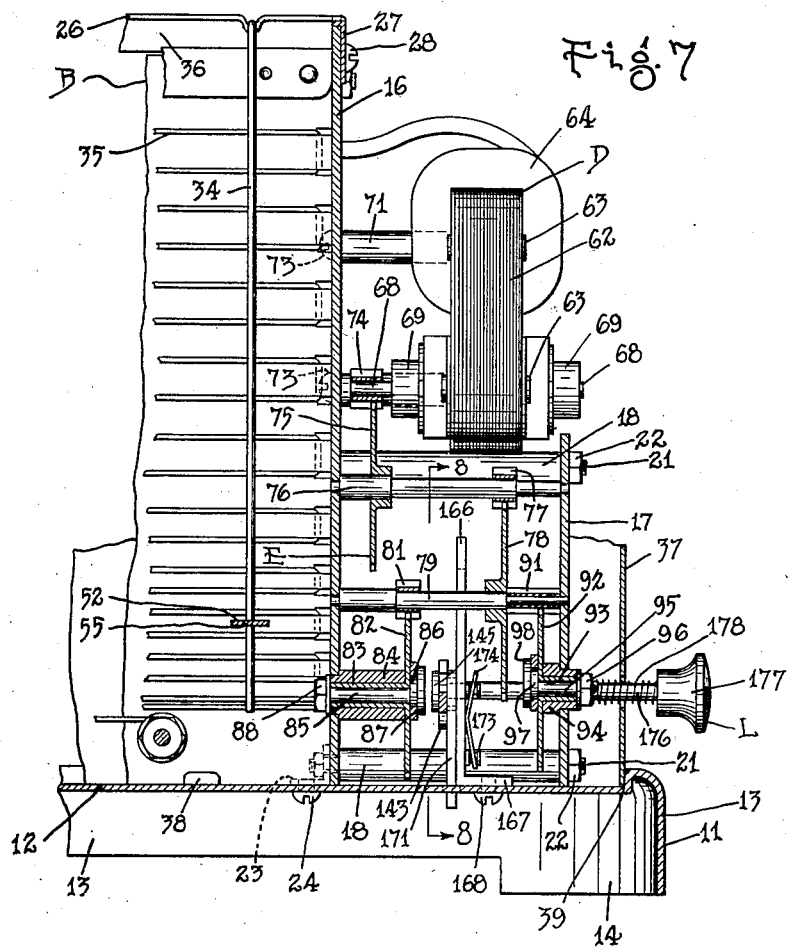
Fig. 7 is a fragmentary elevational sectional view taken on line 7—7 of Fig. 1.

My invention comprises a frame A which is best shown in Figs. 1, 5 and 7. This frame carries at one portion of the same a toaster B and at another portion of the same a timing mechanism C for timing the operation of the toaster. At the locality of the said timing mechanism is provided a motor D and a suitable transmission E for operating the timing mechanism. The timing mechanism includes a time measuring device F and a time varying device G which operate in conjunction to procure toast of equal uniformity regardless of the length of time elapsing between the toasting operations or cycles. The toaster B includes a carriage H having suitable bread racks on which the bread is carried and which are adapted to be lowered to positions adjacent the heating elements of the toaster and to be raised from the positions adjacent said elements to elevated positions when the toasting operation is completed. An elevating mechanism I operates to raise the bread carriage H. By means of an actuating device J the time measuring device F and the time varying device G are set into operation. After the toasting has been completed the carriage H is released by means of a carriage release K. These various parts will now be described in detail.

The frame A comprises a base 11 which may be constructed from sheet metal as a stamping and which has a body portion 12 provided with a flange 13 depending therefrom. At the corners of the flange 13 the same projects downwardly to form feet 14 by means of which the base is supported. Frame A further includes three vertically spaced plates 15, 16 and 17 which are rigidly attached to one another by means of shouldered rods 18 and 19. These rods are formed with threaded reduced shanks 21 which pass through the said plates and which have screwed upon the ends of them nuts 22. By means of this construction the respective plates are held in proper spaced relation and are attached one to the other. The assembly of plates thus formed is secured to the body 12 of base 11 by means of clip angles 23 whch are bolted under the nuts 22 of certain of the rods 18 and 19 and by means of screws 24 which pass through the body 12 and are threaded into said clip angles.

The toaster B is constructed in the following manner: Extending across the two plates 15 and 16 are a number of supporting bars 26 which have flanges 27 overlying said plates and secured thereto by means of screws 28. These bars are spaced apart to form the toasting ovens, which, in the particular toaster illustrated, are two in number and are designated by the reference numerals 31 and 32. The bars 26 are drilled at suitable intervals as designated at 33 to receive guard wires 34 which extend downwardly from the facing marginal edges of the bars 26 and which define the space in which the bread to be toasted is disposed. Beneath the bars 26 are situated the various heating elements 35 which heat the toast ovens 31 and 32. These heating elements are supported on the body 12 of base 11 and are held in position thereon by means of lugs 238 struck up from the same and are further held in position at their upper ends between the inner ends of the guard wires 34 and flanges 36 formed on the bars 26. A case 37 encloses the entire toaster and is constructed with two openings 38 and 39 in the upper portion of the same by means of which the bread may be inserted into the two ovens 31 and 32. The case 37 is received within a recess 40 in the base 11 and is attached thereto by means of screws 41 which extend through said case and are threaded into the base 11.

The toaster B includes the bread carriage H which is best shown in Figs. 1 and 6. This carriage consists of a plate 42 which overlies the outer face of the plate 16 of frame A. In the plate 16 is formed a vertically extending slot 43. The plate 42 overlies this slot. Extending through the plate 42 are two bolts 44 which have mounted upon them spacer sleeves 45 of a thickness slightly greater than the thickness of the plate 16. These sleeves are of a diameter such as to be snugly received in the slot 43 and slide along the same serving to guide the carriage H for vertical movement along said slot. Washers 46 of a diameter somewhat greater than the width of the slot 43 are placed upon the bolts 44 and overlie the said plate upon the inner surface thereof. These washers in conjunction with the plate 42 hold the carriage H in position for vertical translatory movement along the slot 43. Nuts 47 screwed upon the ends of the bolts 44 clamp the parts together. The plate 16 is further constructed with two slots 48 and 49 which are parallel with the slot 43 and which are disposed on either side thereof. These slots lie opposite the two toast ovens 31 and 32. Within the two ovens 31 and 32 are provided two bread racks 51 and 52 on which the bread to be toasted rests. Inasmuch as both of these bread racks are identical in construction, only the bread rack 51 will be described in detail. This bread rack consists of a longitudinally extending grid 53 which is formed from a sheet of metal stamped to provide a centrally extending supporting member 54 and laterally disposed members 55 projecting therefrom. The supporting members 55 are formed near their ends with holes 56 through which the guard wires 34 extend. The said guard wires fit loosely within the holes and are held in proper position by means of the same. The center supporting member 54 of the rack 51 has a flange 57 bent downwardly therefrom which extends through the slot 48. This flange is turned back upon a portion of the plate 42 and is secured thereto by means of screws 61. The rack 52 is constructed in the same manner and attached to the plate 42 in the same manner. It will thus be seen that, as the carriage H is raised and lowered, racks 51 and 52 are raised and lowered with it, the supporting members 55 thereof sliding along the guard wires 34.

Figure 3:
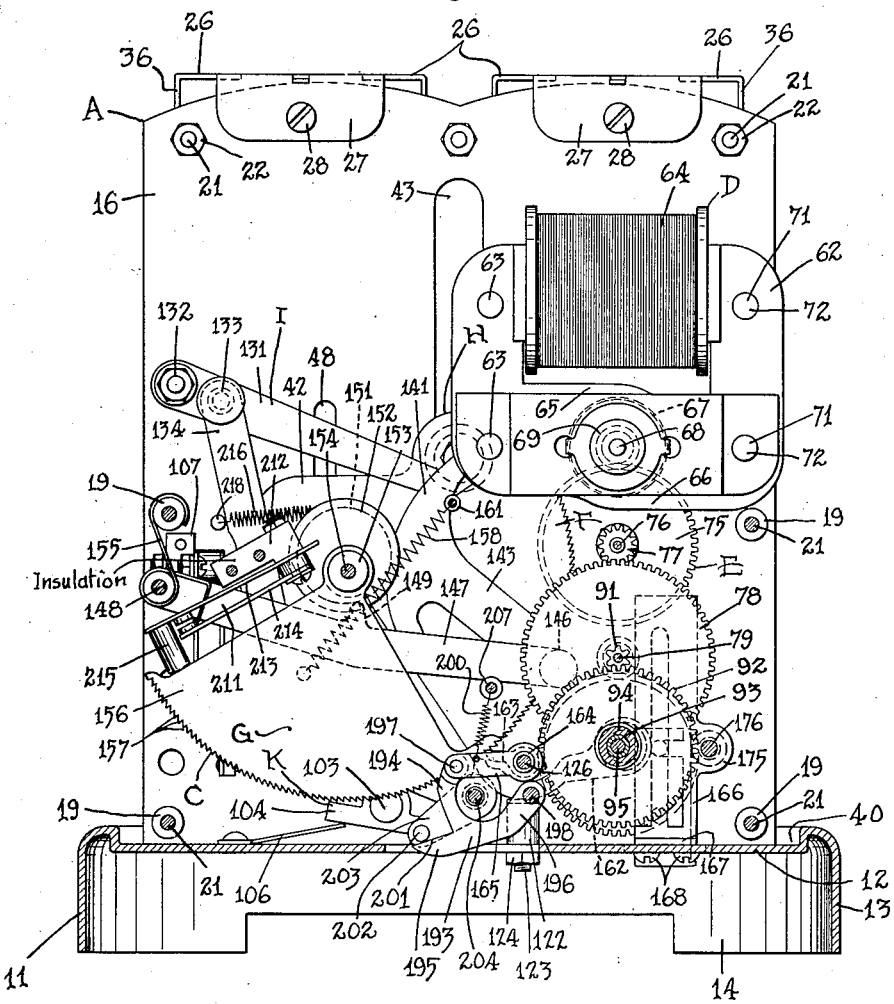
Fig. 3 is a view similar to Fig. 2 showing the parts in altered positions.

The motor D is best shown in Figs. 3 and 7 and is preferably an electric motor. In the drawings such a motor has been shown which comprises a core 62 constructed of iron laminations secured together in the following manner. Two posts 71 are employed which have reduced ends 72 formed thereon which extend through the said laminations and are riveted over to secure the same in place. In addition a number of rivets 63 are also employed which serve to further hold the laminations in place. The posts 71 are attached to the plate 16 by means of screws 73 which extend through the said plates and are threaded into the said posts. The core 62 has mounted on it a coil 64 and is formed with pole pieces 65 and 66. Between these pole pieces is rotatably mounted an armature 67 which is carried by an armature shaft 68. This shaft is journaled in bearings 69 attached to the core 62 by means of one of the rivets 63 and one of the posts 71. The particular type of motor illustrated is a shaded pole motor though it can readily be comprehended that any other type of motor may be used if desired.

The transmission E will now be described in detail. Attached to the armature shaft 68 of motor D is a spur pinion 74. This spur pinion meshes with a spur gear 75 fast on an arbor 76. Arbor 76 is journaled for rotation in bearings drilled in the two plates 16 and 17. The arbor 76 also carries a spur pinion 77. This spur pinion meshes with a spur gear 78 fast on another arbor 79. Arbor 79 is likewise journaled in bearings formed by drilling the two plates 16 and 17. This arbor carries a spur pinion 81 which meshes with a spur gear 82 fast on a sleeve 83. Sleeve 83 is journaled for rotation in a bearing 84 rigidly secured to plate 16. Within the sleeve 83 is mounted a spindle 85 which is formed at its outer end with an eccentric 86 and a flange 87 overlying the said eccentric. This spindle is threaded at its other end and is rigidly secured to the sleeve 83 by means of a nut 88 secured upon the end of the same. The eccentric 86 serves a purpose which will be subsequently described in detail. The arbor 79 has mounted on it another pinion 91. This pinion meshes with a spur gear 92 which similar to the spur gear 82 is attached to a sleeve 93. Sleeve 93 is journaled in a bearing 94 secured to the plate 17. A spindle 95, similar to the spindle 85, extends through the said sleeve and is attached thereto by means of a nut 96. Spindle 95 is similarly provided with an eccentric 97 and a flange 98 overlying said eccentric.

The bread carriage H is elevated by means of the elevating mechanism I which includes a tension coil spring 98 (Fig. 6) which is attached at its lower end to the lowermost of the bolts 44 and is supported at its upper end in a manner to be presently more fully described. When the carriage H is in the position in which the bread is being toasted said carriage is held in such position against the action of the spring 98 by means of a latching device best shown in Fig. 6. Issuing outwardly from the plate 42 is a lug 99. This lug is adapted to engage a catch 101 on an arm 102 pivoted to a stud 103 secured to the plate 16. The arm 102 is formed with two stops 104 and 105 which are adapted to engage the body 12 of base 11 and to limit movement of the said arm. A leaf spring 106 secured to said base engages the stop 104 and urges the arm 102 into a position to cause the catch 101 to engage the lug 99. When the carriage H is lowered the lug 99 engages the catch 101, swings the arm 102 in a counter-clockwise direction until the said lug falls beneath the catch and is held in such position. The heating elements 35 are connected in an electrical circuit, not shown, which is energized by any suitable source of electric current. This circuit includes a switch indicated in its entirety by the reference numeral 107, best shown in Fig. 6. Switch 107 includes a mounting block 108 of insulating material which supports two leaf springs 109 and 111. These springs carry contacts 112 and 113 and are normally flexed so that the said contacts remain open. The leaf spring 111 carries a cam 114 which is adapted to be engaged by a corner 115 of the plate 42. When the said plate is lowered corner 115 swings the cam 114 toward the left and closes the circuit through the contacts 112 and 113 thus energizing the heating elements of the toaster. When the carriage H is subsequently released, as will be hereinafter more fully described, the plate 42 reaches the position shown in Fig. 3 in which the corner 115 is free from the cam 114 and the switch 107 is open. The closed position of the said switch and the relation of the cam and plate 42 are shown in Fig. 5.

Figure 4:
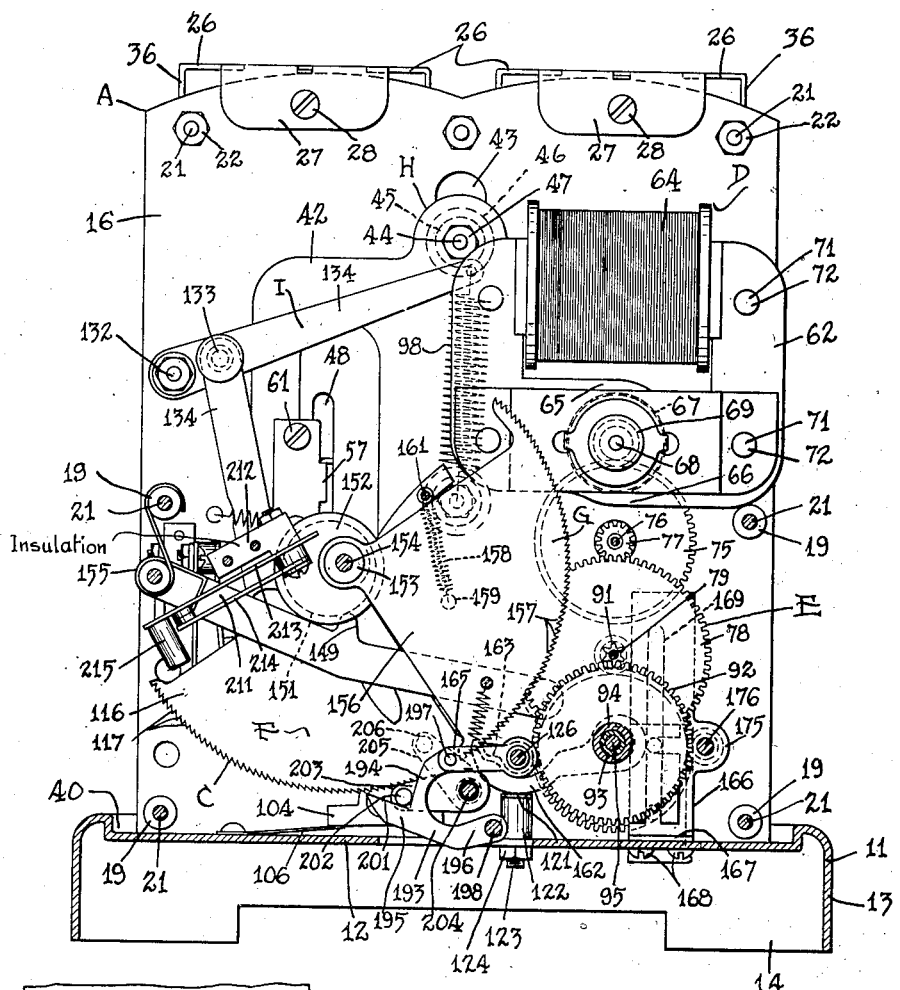
Fig. 4 is a view similar to Figs. 2 and 3 showing the parts in still different positions.
Figure 9:
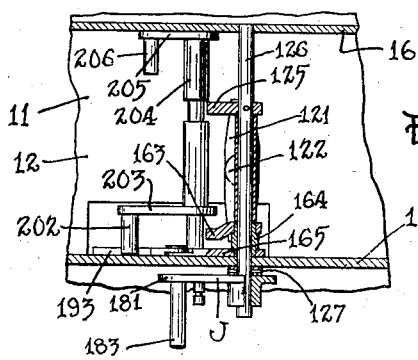
Fig. 9 is a fragmentary plan sectional view taken on line 9—9 of Fig. 2.

The timing mechanism C includes both the time measuring device F and the time varying device E. The former will now be described in detail. This device is best shown in Figs. 5 and 6. Pivoted on a stud 112 secured to the plate 16 is a ratchet segment or wheel 116 which I have termed the time measuring ratchet segment. This segment has ratchet teeth 117 thereon which are constructed so that the segment is moved in a clockwise direction. The segment 116 is operated by means of a pawl 118 which is constructed with a head 119 mounted on the eccentric 86 shown in Figs. 6 and 7. The pawl 118 is urged into engagement with the ratchet teeth 117 by means of a leaf spring 121 which is secured to the base 11 as shown in Fig. 4. This leaf spring is attached to the upper end of a post 122 which is formed with a shank 123 extending through the body 12 of base 11. A nut 124 screwed upon the said shank holds the post 122 in position. A detent 125 operates in conjunction with the pawl 118 to procure step-by-step movement of the ratchet segment 116. This detent is rigidly secured to a shaft 126 which is journaled at one end in a bearing drilled in the plate 16 and at its other end in another bearing drilled in the plate 17. Segment 116 has attached to it an arm 217 to which is hooked a tension coil spring 216. This spring is anchored at its other end to a pin 218 fast on plate 16.

Spring 216 moves segment 116 in a counter-clockwise direction. Upon the exterior of the plate 17, as best shown in Fig. 10, and attached to the shaft 126 is an arm 127. A tension coil spring 128 is attached at one end to this arm and at its other end to a pin 129 secured to plate 17. This spring urges the detent 125 into engagement with the ratchet teeth 17. As the eccentric 86 rotates the pawl 118 and detent 125 cooperate to give the segment 116 a step-by-step movement until the said detent 125 comes to the end of the teeth 117. Thereafter the said segment merely rocks back and forth without advancing as long as motion is imparted to the pawl 118. Detent 125 and the pawl 118 are so constructed that when the said detent is moved in a manner to become disengaged from the ratchet teeth 117 pawl 118 is also engaged by said detent and simultaneously disengaged from the said ratchet teeth.

The elevating mechanism I is best shown in Figs. 5 and 6. This mechanism consists of an arm 131 which is pivoted on a stud 132 secured to plate 16. The spring 98, previously referred to, is attached at its upper end to the outer end of this arm. Arm 131 has pivotally secured to it, intermediate the ends thereof by means of another stud 133 a link 134. Link 134 depends from the arm 131 and is formed at its lower end with a fork 135. Attached to the time measuring ratchet segment 116 is a pin 136 which is formed with a head 137 best shown in Fig. 1. Head 137 is disposed on one side of said segment and the pin proper extends from the other side of the segment. Pin 136 is secured to the segment in any suitable manner as by means of a drive fit. The fork 135 on the lower end of link 134 is adapted to receive the head 137 of pin 136 and when the segment 116 is moved in a clockwise direction said pin raises the arm 131 and tensions the spring 98. This provides the force by means of which the carriage H is subsequently elevated when the said carriage is released by disengagement of the lug 99 with the catch 101 of arm 102.

The carriage release K operates in conjunction with the arm 102, the catch 101 and lug 99 of plate 42 of carriage H. This feature of the invention is best shown in Figs. 5 and 6 and includes an abutment 138 which is secured on the time measuring ratchet segment 116. This abutment is adapted to engage a finger 139 on the arm 102 as the said segment approaches its furthermost position. The device is so constructed that the pin 136 will have elevated the arm 131 sufficiently to give the desired tension in the spring 98 necessary to raise the carriage H the required amount when the catch 101 is disengaged from the lug 99. In this manner the carriage H is positively elevated and the bread raised to a position where the same may be easily removed from the toaster.

The time varying device G is best shown in Figs. 5 and 6. This device includes a time varying cam 141 which has a cam surface 142. This cam surface is adapted to be engaged by the pin 136 and limits the swinging movement of the time measuring ratchet segment 116. When the cam 141 is in one position, the segment 116 may travel throughout a greater arc than when the said cam is in another position. Inasmuch as the detent 125 and pawl 118 can start to act upon the ratchet teeth 117 of segment 116 at any position of the same varying lengths of duration of operation of the said segment 116 can hence be procured by varying the position of cam 141 and releasing the pawl 118 when the segment comes to rest. Cam 141 is mounted in the following manner. An arm 143 issues outwardly from said cam and is formed at its extreme end with a slot 144. This slot serves as a guide for pivotally and slidably mounting the end of arm 143 and receives a pin 145 which, when the device is in operation, is in fixed position and serves as a fulcrum on which the cam 141 oscillates. The pin 145 forms part of a manual adjustment for manually controlling the period of operation of the device and which I have referred to in its entirety by the reference character L and which will subsequently be more fully described. The arm 143 is pivoted intermediate the ends thereof by means of a stud 146 to one end of a lever 147, best shown in Fig. 2. The other end of the lever 147 is pivoted on another stud 148 fixedly attached to the plate 17. The lever 147 is constructed intermediate the ends thereof with a cam follower 149 which is adapted to engage a cam groove 151 formed in the periphery of a cam 152. Cam 152 is rigidly secured to a sleeve 153 which is rotatably mounted on a fixed stud 154 secured to plate 17. The lever 147 is urged upwardly to maintain the cam follower 149 in engagement with the cam groove 151 of cam 152 by means of a helical spring 155 which is wound around the stud 148. One end of this spring is hooked under lever 147 and the other end of this spring is hooked around one of the rods 19. The sleeve 153 has rigidly secured to it (Fig. 4) a ratchet segment or wheel which I have termed the time varying ratchet segment and which is indicated by the reference numeral 156. This ratchet segment is provided with ratchet teeth 157. A spring 158 is secured to a pin 159 fast on said segment and to another pin 161 attached to plate 17. This spring serves to rotate the ratchet segment 156 in a counter-clockwise direction.

The ratchet segment 156 is operated by means of a pawl 162 (Fig. 3) which is constructed similar to the pawl 118 and which is pivoted on and operated by the eccentric 97. This pawl is urged into engagement with the teeth 157 by means of the spring 121, previously referred to. Operating in conjunction with the pawl 162 is a detent 163 which is rigidly secured to a sleeve 164 rotatably mounted on shaft 126. The sleeve 164 also carries an arm 165 by means of which the said sleeve may be rotated and the detent disengaged from the ratchet teeth 157 of the time varying ratchet segment 156. The detent 163 and the pawl 162 are so constructed that rotation of the sleeve 164 causes the detent 163 to engage pawl 162 and to simultaneously disengage both of these ratchet devices from engagement with the ratchet teeth. It will readily be comprehended that, as shaft 95 rotates, the ratchet segment 156 is given a step-by-step movement in a clockwise direction swinging from its direction as shown in Fig. 4. At the same time the cam 152 is being rotated and the cam follower 149 shifted in position to allow the lever 147 to move upwardly. Upward movement of this lever swings the time varying cam 141 upwardly, varying the portion of the cam surface 142, which may be engaged by the pin 136.

Figure 8:
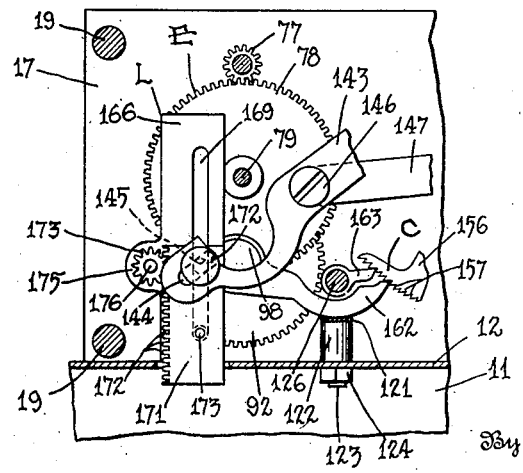
Fig. 8 is an elevational detail sectional view taken on line 8—8 of Fig. 7.

The manual adjustment L is best shown in Figs. 7 and 8. Attached to the body portion 12 of base 11 is a standard 166 which is constructed with a flange 167 resting on said base and attached thereto by means of screws 168. The standard 166 is constructed with a vertically extending slot 169. Slidably mounted on the standard 166, is a gear rack 171. This gear rack has rack teeth 172 adapted to mesh with the teeth of a spur pinion 173. The rack 171 has attached to it the pin 145, previously referred to, and on which the arm 143 of cam 141 is pivoted. This pin has a head 172 which engages the said arm and maintains the arm in position on the pin. The gear rack 171 has attached to it another pin 173 and both the pin 145 and the pin 173 extend through the slot 169 of standard 166 and serve to slidably guide the rack 171 for vertical reciprocating movement. A leaf spring 174, best shown in Fig. 7, engages both of the pins 145 and 173 and bears against the standard 166 and urges the rack 171 into frictional engagement with the standard 166, whereby the rack 171 may be held in adjusted position. The standard 166 is constructed with an ear 175 which forms a bearing for a shaft 176. Spur pinion 273 is fast on the shaft 176 and is rotated by means thereof. The shaft 176 is further journaled in a bearing formed by drilling the plate 17. Shaft 176 extends outwardly beyond the plate 17 and has attached to it a knob 177. A compression coil spring 178, mounted on the protruding portion of shaft 176 engages plate 17 and knob 177 and maintains the spur pinion 173 up against the standard 166 where the same is in position to mesh with the teeth 272 of rack 171. It will thus readily be comprehended that rack 171 may be raised and lowered by turning knob 177. Movement of this rack raises and lowers the pin 145 which forms the fulcrum for the arm 143 of cam 141. Such movement of the arm changes the position of the cam surface 142 so that, when the time measuring ratchet segment 116 is released, different periods of timing may be procured.

The actuating device J includes an actuating lever 181 shown in detail in Fig. 10. This lever is mounted upon the exterior of the plate 17 and is freely rotatable on the protruding end of shaft 126, being held in place thereon by means of a collar 182 attached to said shaft. The lever 181 has a finger piece 183, secured to the same, which is readily accessible for manual manipulation. A tension coil spring 187, secured at one end to a pin 188 on lever 181 and at its other end to a pin 189 fast on plate 17 serves to swing the lever 186 in a clockwise direction. Movement of lever 181 is terminated by means of a stop 191 also secured to plate 17. The lever 181 is disposed outwardly of the arm 127. On the lever 181 is formed a finger 192 which is adapted to engage arm 127 after the lever 181 has been rotated through a predetermined angle and to cause the shaft 126 to swing with it. Movement of the lever 181 in a counter-clockwise direction procures like movement of shaft 126. This causes the detent 125 to engage pawl 118 and both said detent and pawl to become disengaged from the ratchet teeth 117 of the time measuring ratchet segment 116. This releases said segment and the said segment travels in a counter-clockwise direction until its movement is arrested by pin 136 engaging cam surface 142 of cam 141.

The actuating lever 181 also serves to release the time varying ratchet segment 156. This is accomplished in the following manner: Inasmuch as the cam 141 determines the period through which the time measuring ratchet segment 116 operates, it is imperative that the position of the cam 141 be retained until after the pin 136 has engaged the cam surface 142 since the time varying ratchet segment 156 functions only after the time measuring ratchet segment 116 has ceased to function. The release for the segment 156 is made to depend upon the position of the bread carriage H. The arm 165, previously referred to, which is attached to the sleeve 164 and operates detent 163 has pivoted to it an interlocking release member 193, best shown in Fig. 3. This member is T-shaped in form having three arms 194, 195 and 196. A rivet 197, passing through the arm 165 and arm 194, pivots the member 193 to arm 165. Attached to the arm 196 of member 193 is a pin 198 which extends through an opening 199 in plate 17. By means of this opening the pin 198 is free to move and the interlocking member 193 free to operate in its intended manner. The arm 195 of member 193 is constructed with a surface 201 which is adapted to be engaged by a pin 202, fast on an arm 203. Arm 203 is rigidly secured to a shaft 204 which is journaled in suitable bearings formed in the plates 16 and 17. The shaft 204, adjacent the plate 16, has attached to it another arm 205 which has rigidly secured to it a pin 206. Arm 205 is so designed that pin 206 is in the path of movement of lug 99 on bread carriage H. When the bread carriage H is lowered this lug engages pin 206 and swings arm 205 from its position shown in Fig. 6 to that shown in Fig. 5. Correspondingly the arm 203 is moved from its position shown in Fig. 2 to that shown in Fig. 3. Through the nature of the interlocking release member 193, it becomes evident that not until both pin 202 and pin 198 are depressed will the arm 165 be rotated in a counter-clockwise direction. If either of these pins are free the interlocking member 193 fails to function and arm 165 maintains its normal position. Arm 165 is urged towards its position shown in Fig. 4 by means of a tension coil spring 200 which is hooked at one end to the arm 165 and at its other end to a pin 207, fast on plate 17. The lever 181 is constructed with a cam 208 which is adapted to engage the pin 198 and move the same downwardly when the cam 208 engages said pin.

For energizing the motor D a switch 211, Figs. 2 and 3, is employed. This switch comprises an insulating block 212 which is attached to plate 17. This block carries two leaf spring switch elements 213 and 214 which have suitable contacts and which are connected in the motor circuit. Leaf spring 213 has a lug 215 of insulating material secured to the same which is adapted to be engaged by the time varying ratchet segment 156. When this segment is in the position shown in Fig. 3 the switch 211 is open. When the segment 156 moves away from the lug 215 switch 211 becomes closed as shown in Fig. 4.

The operation of the invention is as follows: For the purpose of explaining the method of operation of the invention, it is desired to point out that toasters now in common use require different lengths of time for toasting the succeeding slices of bread inserted in the same, such periods varying with the length of time the toaster is allowed to cool between toasting operations. Where the toaster requires a predetermined period for the first slice, an extremely short period will be required for the second slice if immediately placed in the toaster. If, however, the toaster is allowed to cool for a certain length of time before the second slice is inserted a period somewhere in between the minimum and maximum periods will be required. I have found that with a certain toaster the lengths of time the toaster is permitted to cool can be accurately used to determine the necessary period for toasting when the toaster is used in ordinary room temperatures. The method of utilizing this time element in the determination of the toasting period will be more fully brought out in the following description of the operation of the invention.

When the toaster is cold the various parts are arranged as shown in Fig. 2. In this figure both the time measuring ratchet segment 116 and the time varying ratchet segment 156 are in their initial positions. In such case segment 156 engages lug 215 and holds the switch 211 open and segment 116 engages link 134 and maintains the upper end of spring 98 in its uppermost position. Also bread carriage H is in its elevated position. The operator first places the bread slices in the ovens 31 and 32, the bread resting upon the supporting members 54 and 55 of the bread racks 51 and 52.

The operator in starting the toaster depresses the finger piece 183 on lever 181 which causes lever 181 to move in a counter-clockwise direction against the action of spring 187. As this lever moves, cam 208 is first disengaged from pin 198 which frees the interlocking member 193 and prevents release of detent 163, thus maintaining the time varying ratchet segment 156 in position. As movement of the lever 181 continues, finger 192 engages arm 127 and shaft 126 secured thereto commences to rotate in a counter-clockwise direction. This rotation causes the detent 125 and pawl 118 to become disengaged from the teeth 117 of the time measuring ratchet segment 116. Due to the action of spring 216 ratchet segment 116 is moved from its position shown in Fig. 6 to its position shown in Fig. 5. Movement of the said ratchet segment is arrested when pin 136 engages the surface 142 of cam 141. Since the ratchet segment 156 is in its position shown in Fig. 2, cam follower 149 is engaging a portion of the cam 151 nearest stud 154 and lever 147 is hence in its uppermost position. Correspondingly arm 143 is in its uppermost position and pin 136 engages the heel of the cam 141. Cam surface 142 spirals with respect to its pivot afforded by the stud 146, the lowermost or heel end of the cam being closer to the pivot than the upper or toe end of the cam. Segment 116 has now moved the maximum distance possible permitted by the setting of the manual adjustment L and is in a position to function for the maximum period of time for such setting.

As pin 136 moves with the ratchet segment 116, suport is removed for the link 134 and arm 131 drops to the position shown in Fig. 5. Inasmuch as this arm forms a support for the bread carriage H, the said bread carriage also drops and the lug 99 engages the catch 101 on the arm 102. Said catch is held in engagement with lug 99 through the leaf spring 106. At the same time the lug 99 engages pin 206 on arm 205, which swings shaft 204 in a counter-clockwise direction. This moves the arm 195 of the interlocking member 193 downwardly. However, pin 198, at this position of lever 181, is disengaged from cam 208 and the interlocking member 193 moves without effecting movement of the arm 165 which controls the detent 163. Therefore the time varying ratchet segment 156 still remains in the position shown in Fig. 3.

As the bread carriage H travels downwardly the rounded corner 115 of plate 42 of bread carriage H engages cam 114 and moves the leaf spring 111 of switch 107 in a manner to close said switch. This energizes the heating elements 56 of the toaster proper and heating of the toasting ovens 31 and 32 is initiated.

As soon as lever 181 is released, finger 192 becomes disengaged from arm 127 and the detent 125 and pawl 118 are released and are in a position to function as soon as motor D is energized. The detent 125 and pawl 118 are now in engagement with teeth 117 of the time measuring ratchet segment 116 and will prevent further counter-clockwise movement of the said segment. As the lever 181 is further moved cam 208 engages pin 198 and moves the said pin downwardly. Since the pin 202 has already been depressed through the action of arms 205 and 203 by lug 99 on the bread carriage H movement of the pin 198 downwardly causes movement of arm 165 in a counter-clockwise direction which releases the detent 163 and pawl 162 from engagement with the teeth 157 of the time varying ratchet segment 156 permitting movement of said segment as will be hereinafter described. Movement of the time varying ratchet segment 156 causes movement of cam 152 since the said two parts are connected together through sleeve 153. As the cam 152 rotates, the portion of the same, more remotely situated from the stud 154, engages cam follower 149 and swings lever 147 downwardly. This simultaneously swings arm 143 downwardly and moves the cam 141 downwardly. Segment 156 after release from pawl 162 and detent 163 is free to travel in a counter-clockwise direction except as limited by the cam 141 engaging the pin 136. Upon release of the segment 156 the said segment initially moves a small amount to take up the play in the connection between lever 147 and arm 143 and in the connection between pin 145 and slot 144. This movement is sufficient to close switch 211 which energizes motor D. Motor D now actuates eccentric 86 which operates the pawl 118 to move segment 116 in a clockwise direction. As said segment is so moved pin 136 is moved away from its position shown in Fig. 5, which permits the cam 141 to travel in a downward direction. Spring 158 during movement of segment 116 urges segment 156 to move in a counterclockwise direction. This movement is controlled by the pin 136 and after segment 116 has moved a part of its total movement cam 141 is free from pin 136 and said cam and segment 156 occupy the positions shown in Fig. 4. Movement of segment 156 by spring 158 is terminated when said segment strikes pin 161. When such termination of movement occurs the upper or toe end of the said cam is in a position to be engaged by the pin 136 of the time measuring ratchet segment 116 when the same is subsequently released. Due to the fact that the portion of the cam surface 142 spirals outwardly from the axis of the stud 146, the time interval through which the time measuring ratchet segment 116 would move would be considerably less than when the cam 141 is in its opposite position.

As the segment 156 leaves the lug 215, switch 211 is closed and motor D is energized. This sets in operation the train of gearing connected thereto and both of the eccentrics 86 and 97 are operated which cause periodic reciprocations of the two pawls 118 and 162. Inasmuch as the detent 163 and pawl 162 are out of engagement with the teeth 157 of the time varying ratchet segment 156 due to simultaneous depression of both the pins 202 and 198, the movement of pawl 162 has no effect on the said ratchet segment and the said ratchet segment remains in its inoperative position. However, the pawl 118 and detent 125 being in engagement with the teeth 117 of the time measuring ratchet segment 116 a step-by-step movement is given to the same, tending to move the same in a clockwise direction toward the position shown in Fig. 6. During the period of time when the said segment is so moving, toasting of the bread within the toast ovens 51 and 52 is taking place. As soon as the head 137 of pin 136 engages the fork 135 of link 134 arm 131 is moved upwardly. As this arm moves upwardly, spring 98 is gradually being tensioned due to the fact that the lug 99 is engaged with the catch 101 and the bread carriage H held in its lowermost position. When the time measuring ratchet segment 116 is moved to a sufficient degree, abutment 138 engages finger 139 on arm 102 and moves the said arm in a manner to disengage the catch 101 from the lug 99. Through the action of spring 98, which has now been sufficiently tensioned the bread carriage H is rapidly moved upwardly and the bread, which has now been toasted, is moved out of the toast ovens 51 and 52 a sufficient amount so that the same may be manually grasped and removed from the toaster. As the corner 115 of plate 142 of bread carriage H leaves the cam 114, switch 107 is opened and the heating elements of the toaster are de-energized. The entire toaster now commences to cool.

As soon as the bread carriage H is raised, lug 99 becomes disengaged from pin 206 on arm 205 and said arm, through the action of spring 200, is moved upwardly. If now additional slices of bread are immediately placed in the toast ovens and the bread carriage H released by again depressing the lever 181 through the finger piece 186 the cycle of operations will be repeated and the pin 136 will engage the surface 142 of cam 141 at a locality above its original position of engagement and permit the time measuring ratchet segment 116 to be retracted a smaller amount. As soon as the detent 125 and pawl 118 are set in operation, the time measuring ratchet segment 116 will then travel through a shorter arc and release the toast in a shorter time. It is thus possible through proper design of the cam 141 to procure the same results as with the toaster cold.

If however, the toaster is not immediately used and is allowed to cool, then the detent 163 and pawl 162 commence to move the time varying ratchet segment 156 in a clockwise direction. Suppose for instance, bread slices are inserted into the toast ovens before the time varying ratchet segment 156 reaches the position shown in Fig. 3, then the operation of the invention will be as follows: At such time the cam 141 will occupy a position with respect to its extreme positions intermediate thereof and pin 136 will, when the ratchet segment 116 is released, engage cam surface 142 at a locality intermediate the heel and toe end thereof. When lever 181 is depressed, the same cycle of operations will occur excepting that the arc of travel of the time measuring ratchet segment 116 will have a direct relation with respect to the time that the toaster had cooled so that the toasting period as determined by this ratchet segment 156 will be intermediate between the toasting period when the toaster is cool and when the toaster is fully heated. The cam 141 is so designed that the period thus procured is always proper to produce toast of the same brownness as when the toaster is operated either cooled or fully heated.

The extent of the arc of the segment 156 is sufficient so that when the segment reaches its extreme position and opens switch 211 the toaster is sufficiently cooled so that the brownness of the toast made in the toast ovens would be exactly the same as if the bread were inserted in a cold toaster. Therefore, when the segment reaches such position, the motor D is deenergized and the moving parts are then at rest and in the position shown in Fig. 2. It will thus become readily apparent that toast of uniform color can be procured regardless of when the cycle of operation is initiated.

In the use of my invention the degree of brownness of the toast is determined by adjusting knob 177. As this knob is rotated, gear rack 171 may be raised and lowered through the pinion 173. Inasmuch as the arm 143, which carries cam 141, is pivoted both to lever 147 and to the pin 145 it will become evident that raising and lowering gear rack 171 will swing the arm 143 on the stud 146 as a pivot, thereby raising and lowering the cam 141. This proportionately varies the toasting period by limiting the degree of retraction of the time measuring ratchet segment 116. For each adjustment of the lever 143 through the knob 177, pin 136 is caused to operate on a different zone of the cam surface 142. In other words, when light colored toast is desired pin 136 operates on a zone on the toe end of cam surface 142 and when dark toast is required the said pin operates on the said heel end of the cam surface. Adjustment of the lever 143 by the manual adjustment L does not in any way interfere with the operation of the time measuring device F or the time varying device G which function in identically the same manner as previously described.

Changes in the specific form of my invention, as herein disclosed, may be made within the scope of what is claimed without departing from the spirit of my invention.

Having described my invention, what I claim as new and desire to protect by Letters Patent is:

1. In combination a periodically operable time measuring device, a time controlled, time varying device depending solely upon the lapse of time for varying the duration of the periods of time measured by said time measuring device and means for actuating said time varying device upon completion of a cycle of operation of said time measuring device.

2. In combination a periodically operable time measuring device including a movable member movable uniformly in accordance with the lapse of time during a period of said time measuring device, variable limiting means for limiting the extent of the effective movement of said movable member, a second movable member movable uniformly in accordance with lapse of time and varying said limiting means, and means for initiating movement of said second movable member upon completion of a cycle of movement of said first movable member.

3. In combination a movable member capable of travel over varying distances along a certain path, means for moving said member at a predetermined rate of speed along said path, varying means for varying the distance traveled by said member along said path, a second movable member, means for moving said second movable member during successive cycles at the same predetermined rate of speed, means for actuating said second movable member upon said first movable member reaching a certain position in its path of travel and means for operating said varying means from said second movable member in accordance with the rate of movement thereof.

4. In combination, a movable member capable of travel in opposite directions along a certain path, means for progressively moving said member in one direction from any position in its path of travel to another position in said path, means for moving said movable member in the reverse direction, shiftable limit means for limiting the reverse movement of said movable member, a second movable member, means for progressively moving said second movable member at a uniform rate of speed, means for rendering said last named means operable upon said first movable member reaching a predetermined position along its path of travel, and means operated by said second movable member for shifting said limit means to vary the extent of travel of said first movable member in definite relation with respect to the extent of travel of said second movable member.

5. In combination, a movable member capable of travel in opposite directions along a certain path, means for progressively moving said member in one direction from any position in its path of travel to another position in said path, means for moving said movable member in the reverse direction, a movable cam for limiting the reverse movement of said movable member and shiftable to arrest movement of said movable member at various positions along its path of travel, a second movable member, means for progressively moving said second movable member at a uniform rate of speed, means for rendering said last named means operable upon said first movable member reaching a predetermined position along its path of travel and means operated by said second movable member for shifting said cam to vary the extent of travel of said first movable member in definite relation with respect to the extent of travel of said second movable member.

6. In combination, a movable member capable of travel in opposite directions along a certain path, means for progressively moving said member in one direction from any position in its path of travel to another position in said path, means for moving said movable member in the reverse direction, a pivoted member having portions thereof adapted to be independently engaged to limit movement of said movable member in the reverse direction of movement thereof and at different positions in its path of movement, a second movable member, means for progressively moving said second movable member at a uniform rate of speed, means for rendering said last named means operable upon said first movable member reaching a predetermined position along its path of travel and means operated by said second movable member for swinging said pivoted member to vary the extent of travel of said first movable member in definite relation in respect to the extent of travel of said second movable member.

7. In combination, a movable member capable of travel in opposite directions along a certain path, means for progressively moving said member in one direction from any position in its path of travel to another position in said path, means for moving said movable member in the reverse direction, a stop movable in conformity with the movement of said movable member, a pivoted cam having a cam surface adapted to be positioned in the path of movement of said stop to present different portions thereof for engagement with said stop to vary the position to which said movable member is arrested, a second movable member, means for progressively moving said second movable member at a uniform rate of speed, means for initiating operation of said last named means upon said first movable member reaching a predetermined position along its path of travel and means operated by said second movable member for swinging said cam to expose different portions of the surface thereof for engagement with said stop to vary the extent of travel of said first movable member with definite relation to the extent of travel of said second movable member.

8. In combination, a movable member capable of travel in opposite directions along a certain path, means for progressively moving said member in one direction from any position in its path of travel to another position in said path, means for moving said movable member in the reverse direction, a stop movable in conformity with the movement of said movable member, a pivoted cam having a cam surface adapted to be positioned in the path of movement of said stop to present different portions thereof for engagement with said stop to vary the position to which said movable member is arrested, a second movable member, means for progressively moving said second movable member, means for rendering said last named means operable upon said first movable member reaching a predetermined position along its path of travel, a cam operated by said second movable member and means moved by said second cam and connected to said first cam for swinging said first cam to cause said stop to engage different portions of said first cam to vary the extent of travel of the first movable member.

9. In combination, a movable member capable of travel in opposite directions along a certain path, means for progressively moving said member in one direction from any position in its path of travel to another position in said path, means for moving said movable member in the reverse direction, a stop movable in conformity with the movement of said movable member, a pivoted cam having a cam surface adapted to be positioned in the path of movement of said stop to present different portions thereof for engagement with said stop to vary the position to which said movable member is arrested, a second movable member, means for progressively moving said second movable member, means for rendering said last named means operable upon said first movable member reaching a predetermined position along its path of travel, a pivoted lever connected to said cam, a second cam movable with said second movable member and means on said lever for engaging said second cam operating to swing said first cam and vary the extent of travel of the first movable member.

10. In combination, a ratchet wheel capable of travel in opposite directions, a pawl for progressively moving said wheel in one direction, a detent engageable with said ratchet wheel and restraining reverse movement thereof, means for rendering said pawl and detent inoperable, resilient means for moving said ratchet wheel in the reverse direction upon the pawl and detent becoming inoperable, an abutment movable in conformity with the movement of said ratchet wheel, a pivoted cam having a cam surface adapted to be engaged by said abutment, said cam being movable to present different portions of said cam surface for engagement with said abutment, a second ratchet wheel, a pawl for progressively moving said second ratchet wheel, a detent for restraining reverse movement of said second ratchet wheel, means for rendering said second pawl inoperative to move said second ratchet wheel, means operated by said first ratchet wheel for rendering said last named means operative whereby said second pawl is caused to move said second ratchet wheel, said last named means becoming effective when the first ratchet wheel has been progressively moved to a certain locality in its course of movement and means operated by said second ratchet wheel for swinging said cam to progressively shift the cam surface thereof with respect to the path of movement of said abutment in definite relation with respect to the travel of said second ratchet wheel.

11. In combination, a ratchet wheel capable of travel in opposite directions, a pawl for progressively moving said wheel in one direction, a detent engageable with said ratchet wheel and restraining reverse movement thereof, means for rendering said pawl and detent inoperable, resilient means for moving said ratchet wheel in the reverse direction upon the pawl and detent becoming inoperable, an abutment movable in conformity with the movement of said ratchet wheel, a pivoted cam having a cam surface adapted to be engaged by said abutment, said cam being movable to present different portions of said cam surface for engagement with said abutment, a second ratchet wheel, a pawl for progressively moving said second ratchet wheel, a detent for restraining reverse movement of said second ratchet wheel, a pivoted lever pivotally connected to said cam at one locality with respect thereto, an adjustable pivot for said cam, a second cam traveling in conformity with the movement of said second ratchet wheel, a cam follower movable with said lever and engaging said second cam to swing said first cam so as to present different portions of the surface thereof for engagement with said abutment and means for actuating said second ratchet wheel when the first ratchet wheel is progressively moved to a predetermined position.

12. In a food cooker, heating means, a constant speed time controlled device for controlling the operation of said heating means, a second constant speed time controlled device and means subject to the operation of said second time controlled device for controlling the operation of said first time controlled device.

13. In a food cooker, heating means, a constant speed time controlled device for terminating energization of said heating means, a second constant speed time controlled device and means subject to the operation of said second time controlled device for controlling the operation of said first time controlled device.

14. In combination, a movable member capable of travel in opposite directions along a certain path, means for progressively moving said member in one direction from any position in its path of travel to another position in said path, means for moving said movable member in the reverse direction, a pivoted member having portions thereof adapted to be independently engaged to limit movement of said movable member in the reverse direction of movement thereof and at different positions in its path of movement, a second movable member, means for progressively moving said second movable member, means for rendering said last named means operable upon said first movable member reaching a predetermined position along its path of travel, said pivoted member having two pivotal connections, an adjustable support for one of said pivotal connections and means operated by said second movable member and connected to the other pivotal connection for shifting said pivoted member to vary the extent of travel of said first member, said last named means operating to present different portions of said pivoted member for action when the support for the other pivotal connection is adjusted.

15. In combination, a movable member capable of travel in opposite directions along a certain path, means for progressively moving said member in one direction from any position in its path of travel to another position in said path, means for moving said movable member in the reverse direction, shiftable limit means for limiting the reverse movement of said movable member, a second movable member, means for progressively moving said second movable member, means for rendering said last named means operable upon said first movable member reaching a predetermined position along its path of travel, means operated by said second movable member for shifting said limit means to vary the extent of travel of said first movable member in definite relation with respect to the extent of travel of said second movable member, and means for locking said second movable member in moved position while said first movable member is being moved in reverse direction.

16. In combination, a movable member capable of travel in opposite directions along a certain path, a movable device controlled thereby, motive means for progressively moving said member in one direction from any position in its path of travel to another position in said path, resilient means for moving said movable member in reverse direction, shiftable limit means for limiting the reverse movement of said movable member, a second movable member for shifting said limit means, motive means for progressively moving said second movable member in one direction, means for rendering said last named means operable upon reverse movement of said first movable member, resilient means for moving said second movable member in reverse direction, a release for releasing both of said movable members to be moved in reverse direction by the resilient means, and means controlled by said movable device for rendering said release means inoperable as to said second movable member until initiation of operation of said first movable member.

17. In combination, a movable member capable of travel in opposite directions along a certain path, motive means for progressively moving said member in one direction from any position in its path of travel to another position in said path, resilient means for moving said member in reverse direction, shiftable limit means for limiting the reverse movement of said movable member, a second movable member for shifting said limit means, motive means for progressively moving said second movable member in one direction, resilient means for moving said second movable member in the opposite direction, means for rendering said last named motive means operable upon reverse movement of said first movable member, and a release for said second movable member operable upon initiation of movement of said first named motive means.

18. In combination, a movable member capable of travel in opposite directions along a certain path, motive means for progressively moving said member in one direction from any position in its path of travel to another position in said path, resilient means for moving said movable member in reverse direction, shiftable limit means for limiting the reverse movement of said movable member, a second movable member for shifting said limit means, motive means for progressively moving said second movable member in one direction, means for rendering said last named means operable upon reverse movement of said first movable member, resilient means for moving said second movable member in reverse direction, a latch for latching said first movable member against movement by said first resilient means, a second latch for latching said second movable member against movement by said second resilient means, a movable release member, said release member operating to first release said first latch to free said first movable member for movement up to said limit means and subsequently after actuation of said first motive means releasing said second latch.

19. In combination, a movable member capable of travel in opposite directions along a certain path, a movable device controlled thereby, motive means for progressively moving said movable member in one direction from any position in its path of travel to another position in said path, resilient means for moving said movable member in reverse direction, shiftable limit means for limiting the reverse movement of said movable member, a second movable member for shifting said limit means, motive means for progressively moving said second movable member in one direction, means for rendering said last named motive means operable upon reverse movement of said first movable member, resilient means for moving said second movable member in reverse direction, a latch for latching said first movable member against movement by said first resilient means, a second latch for latching said second movable member against movement by said second resilient means, a movable release member, said release member operating to first release said first latch to free said first movable member for movement up to said limit means and upon actuation of said first motive means to subsequently release said second latch, said movable device when in one position rendering said release device inoperative to release said second latch.

20. In combination, a movable member capable of travel in opposite directions along a certain path, a movable device controlled thereby, motive means for progressively moving said movable member in one direction from any position in its path of travel to another position in said path, resilient means for moving said movable member in reverse direction, shiftable limit means for limiting the reverse movement of said movable member, a second movable member for shifting said limit means, motive means for progressively moving said second movable member in one direction, means for rendering said last named means operable upon reverse movement of said first movable member, resilient means for moving said second movable member in reverse direction, a latch for latching said first movable member against movement by said first resilient means, a second latch for latching said second movable member against movement by said second resilient means, a movable release member, an interlocking device acting between said second latch, said release member and said movable device, said release member upon movement to one position releasing said first latch to cause said first movable member to move up to said limit means, said release member when occupying another position and said movable device when occupying one of its positions releasing said second latch.

21. In combination, a movable member capable of travel in opposite directions along a certain path, a movable device controlled thereby, motive means for progressively moving said movable member in one direction from any position in its path of travel to another position in said path, resilient means for moving said movable member in reverse direction, shiftable limit means for limiting the reverse movement of said movable member, a second movable member for shifting said limit means, motive means for progressively moving said second movable member in one direction, means for rendering said last named means operable upon reverse movement of said first movable member, resilient means for moving said second movable member in reverse direction, a latch for latching said first movable member against movement by said first resilient means, a second latch for latching said second movable member against movement by said second resilient means, a movable release member, a T-shaped interlocking member having a stem and outwardly diverging arms, said stem being pivoted to a part movable with said second latch, means on said movable device for engaging one of said arms, and means on said release member for engaging the other of said arms, simultaneous engagement of said arms serving to release said second latch.

22. In combination, a periodically operable time measuring device including a movable member movable uniformly in accordance with the lapse of time during a period of said time measuring device, variable limiting means for limiting the extent of the effective movement of said movable member, a second movable member movable uniformly in accordance with lapse of time and varying said limiting means, means for initiating movement of said second movable member upon completion of a cycle of movement of said first movable member, and resilient means for returning the second movable member to normal position upon initiation of movement of the first movable member.

23. In combination, a movable member capable of travel in opposite directions along a certain path, means for progressively moving said movable member in one direction from any position in its path of travel to another position in said path, means for moving said movable member in the reverse direction, shiftable limit means for limiting the reverse movement of said movable member, a second movable member, motive means for progressively moving said second movable member in one direction, resilient means for moving said second movable member in the other direction, means for rendering said motive means operable upon said first movable member reaching a predetermined position along its path of travel, means operated by said second movable member for shifting said limit means to vary the extent of travel of said first movable member, and means for transferring control of said second movable member from said motive means to said resilient means for instantly re-setting said second movable member upon initiation of operation of said first movable member.

24. In combination, a periodically operable time measuring device including a movable member movable uniformly in accordance with the lapse of time during a period of said time measuring device, variable limiting means for limiting the extent of the effective movement of said movable member, a second movable member, motive means for moving said second movable member in one direction in accordance with the lapse of time, resilient means for moving said second movable member rapidly in the opposite direction, means for rendering said motive means operative to move said second movable member in one direction upon completion of a cycle of movement of said first movable member, and means for transferring control from said motive means to said resilient means upon initiation of movement of said first movable member.

25. In combination, a periodically operable time measuring device including a movable member, a time controlled time varying device for varying the duration of the periods of time measured by said time measuring device and including a movable member and a common motive means for moving both of said movable members.

26. In combination, a periodically operable time measuring device including a movable member, a time controlled, time varying device for varying the duration of the periods of time measured by said time measuring device and including a movable member, a common motive means adapted to be connected to either of said movable members to move the same throughout the timed movement thereof and means for connecting said motive means first to one of said movable members and then to the other of said movable members.

27. In combination, a periodically operable time measuring device including a movable member, a time controlled, time varying device for varying the duration of the periods of time measured by said time measuring device and including a movable member, a common motive means adapted to be connected to either of said movable members to move the same throughout the timed movement thereof and means for connecting said motive means first to the movable member of said time measuring device and subsequently to the movable member of the time varying device.

28. In combination, a periodically operable time measuring device, a time varying device having a movable member for varying the duration of the periods of time measured by said time measuring device and means for moving said movable member at each cycle for successive increments of space at the same predetermined time intervals for each cycle.

ROBERT SARDESON.